United States Patent [19]

Newland

[11] Patent Number: 4,464,840
[45] Date of Patent: Aug. 14, 1984

[54] MEASURING THICKNESS

[76] Inventor: David E. Newland, Beck, Malthouse La., Burn Bridge, Harrogate, N. Yorks., England, HG3 1PD

[21] Appl. No.: 438,778

[22] Filed: Nov. 3, 1982

[30] Foreign Application Priority Data

Nov. 4, 1981 [GB] United Kingdom ............... 8133293

[51] Int. Cl.³ ........................... G01B 7/06; G01B 7/28
[52] U.S. Cl. .............................. 33/147 E; 33/147 L; 33/147 N; 33/174 PA
[58] Field of Search ............ 33/143 L, 147 E, 147 L, 33/147 N, 148 H, 149 J, 174 L, 174 P, 174 PA

[56] References Cited

U.S. PATENT DOCUMENTS

| | | | |
|---|---|---|---|
| 2,648,912 | 8/1953 | Osgood | 33/174 P |
| 2,703,456 | 3/1955 | Smyth | 33/174 P |
| 2,763,934 | 9/1956 | Creek et al. | 33/147 E |
| 2,799,206 | 7/1957 | Fuller | 33/174 P |
| 2,864,171 | 12/1958 | Edling et al. | 33/147 L |
| 3,680,215 | 8/1972 | Plough | 33/147 L |
| 4,005,528 | 2/1977 | Albertazzi | 33/147 N |
| 4,146,967 | 4/1979 | Rohner et al. | 33/174 P |

FOREIGN PATENT DOCUMENTS

| | | | |
|---|---|---|---|
| 1032557 | 12/1954 | Fed. Rep. of Germany | 33/174 P |
| 1217526 | 5/1960 | France | 33/174 P |
| 1049760 | 11/1966 | United Kingdom . | |
| 1320860 | 6/1973 | United Kingdom . | |
| 1410075 | 10/1975 | United Kingdom . | |
| 1483098 | 8/1977 | United Kingdom . | |
| 1501032 | 2/1978 | United Kingdom . | |

Primary Examiner—Richard R. Stearns
Attorney, Agent, or Firm—Norbert P. Holler; Charles A. Blank

[57] ABSTRACT

Apparatus for measuring the thickness of a workpiece (34) at a plurality of predetermined points separated one from another along a predetermined measurement line. A caliper has first and second opposed jaws (20, 22) mounted on a support (19), which is biased to maintain the first jaw (20) in contact with a first surface of the workpiece. The second jaw is biased relative to the support to maintain the second jaw in contact with a second, opposite, surface of the workpiece. A transducer (24a) is controlled by the second jaw to produce an output signal representative of workpiece thickness. The workpiece is mounted for relative movement between the workpiece and the caliper so that the predetermined measurement line passes between the jaws of the caliper. The output signal is sampled as the predetermined points pass between the jaws of the caliper, and the sample signals are processed to provide thickness measurements at the predetermined points.

7 Claims, 4 Drawing Figures

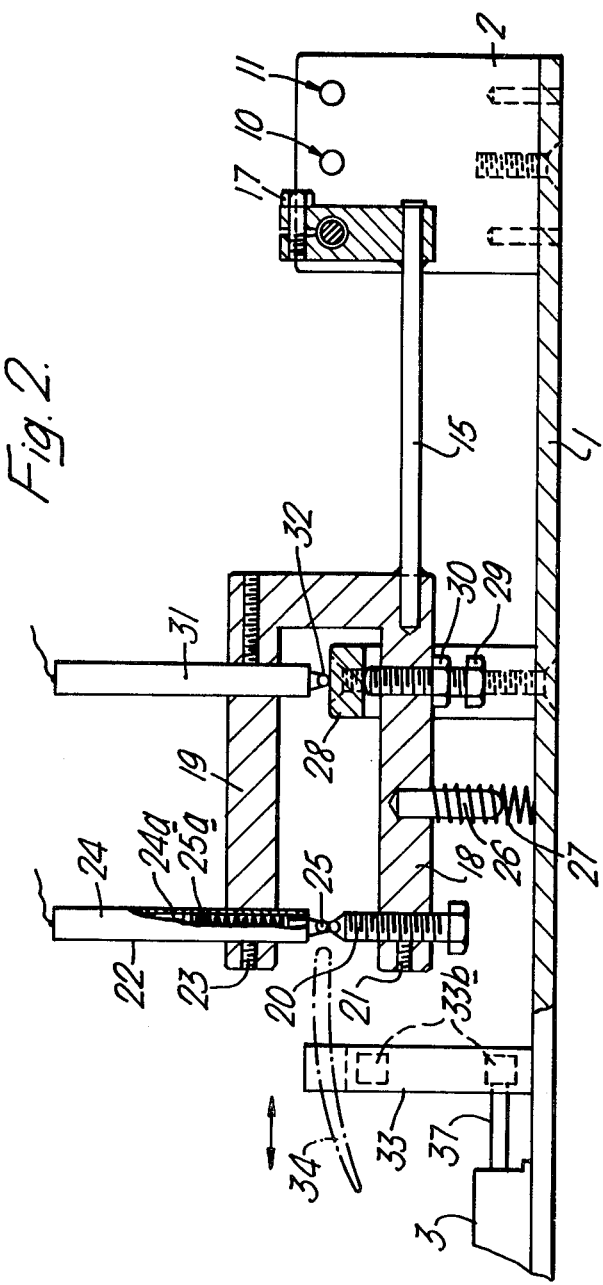

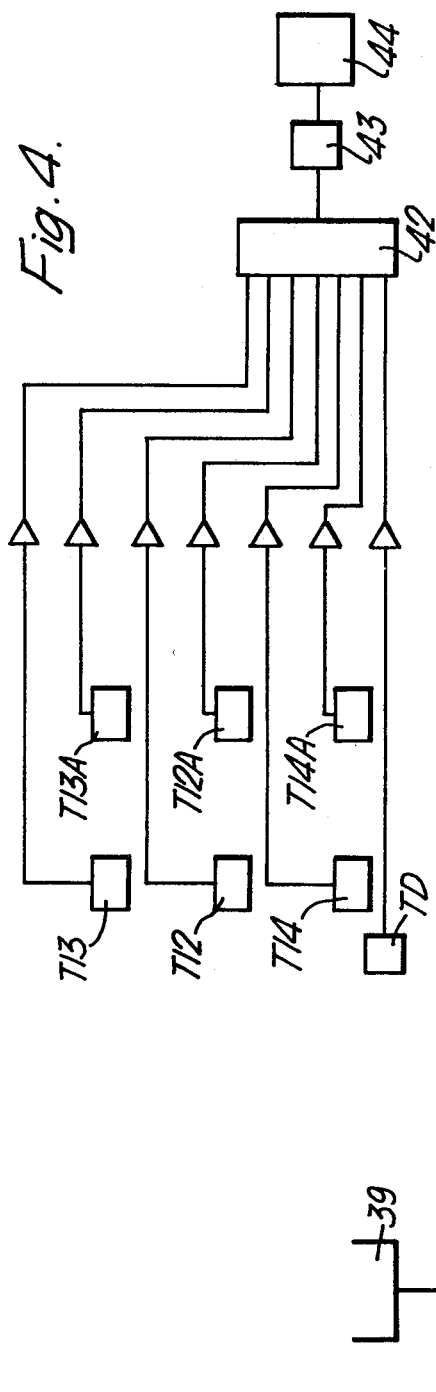
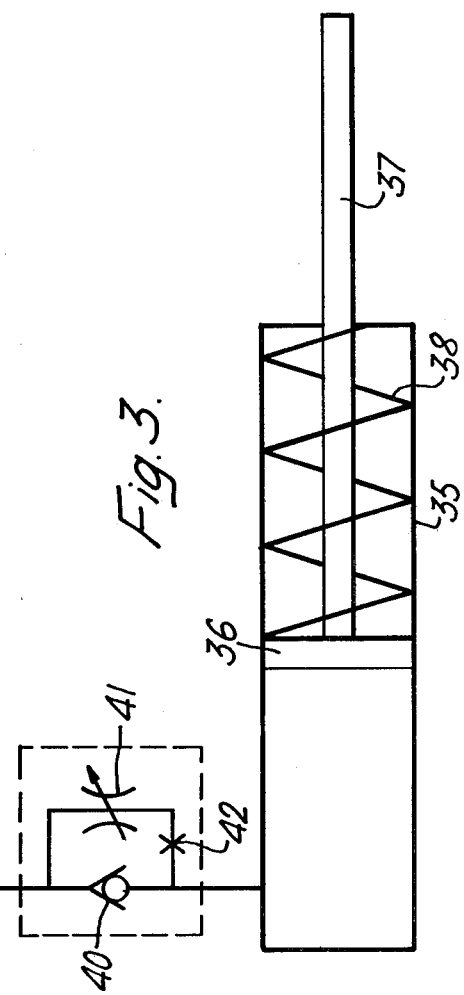

MEASURING THICKNESS

This invention relates to apparatus for measuring the thickness of a workpiece at a plurality of predetermined points.

In the quality control of turbine blades it is necessary to measure blade thickness at a plurality of predetermined points of the blade. Typically for nine points this check is made in three stages, in the first stage of which the thickness at three spaced points forming a triangle is checked; in the second and third stages the thickness at correspondingly spaced points forming two more triangles is checked. In each stage the blade is mounted in a fixture containing three dial indicators which give the deviation of blade thickness from a standard at the three points, the dial indicator in each case being mounted directly over a support pin. This technique involves handling of the blade between the individual stages and is dependent on operator skill in achieving accurate location of the blade in each stage. There is a need for a simple, accurate and inexpensive system of effecting these measurements, and the objective of the invention is to provide such a system. However, the invention is not limited to the measurement of thickness of turbine blades and can effectively be used to measure thickness of many different types of workpiece.

According to the present invention apparatus for measuring the thickness of a workpiece at a plurality of predetermined points separated one from another along a predetermined measurement line comprises a caliper having first and second opposed jaws mounted on a support, means for biasing the support to maintain the first jaw in contact with a first surface of the workpiece, means for biasing the second jaw relative to the support to maintain the second jaw in contact with a second surface of the workpiece, a transducer controlled by the second jaw to produce a signal representative of workpiece thickness, means for mounting the workpiece, means for effecting relative movement between the workpiece and the caliper so that the predetermined measurement line passes between the jaws of the caliper, means for sampling the output signal from the transducer as the predetermined points pass between the jaws of the caliper, and means for processing the sample signals to provide thickness measurements at the predetermined points.

By simply loading the workpiece on its mounting means and effecting the relative movement while monitoring the output signal from the transducer and sampling this as required, direct measurement of thicknesses can be rapidly and simply obtained.

Preferably the measurement line is rectilinear and the means for effecting relative movement are such as to effect rectilinear movement of the workpiece. It is generally simpler solely to move the workpiece, although alternatively linear movement could be effected of the caliper or of both the caliper and the workpiece. The means for effecting relative movement may take any one of a number of forms, for example stepping motors or other electrical drive means may be used, or fluid-operated drive means may be used. In a particularly preferred and simple embodiment, a fluid-operated system capable of being manually charged against spring action and discharging under the action of the spring through a restricting control valve is used.

Where thickness measurements are required at a plurality of predetermined points along each of a plurality of spaced apart parallel measurement lines then desirably the apparatus includes a plurality of calipers equal to the plurality of measurement lines, the calipers being suitably spaced apart and each mounted on a support, and means being provided for sampling the output signal from the transducer associated with each of the calipers. Thus, a simultaneous thickness measurement along a plurality of measurement lines can very simply be effected. This is of particular significance in the measurement of turbine blade thickness as it eliminates transfer of the blade between different measuring fixtures.

In this latter embodiment each caliper may conveniently be carried by an arm extending from a mounting arrangement, one or more of the arms being adjustable on the mounting arrangement in order to adjust the spacing between adjacent calipers. The apparatus may thus be set as required to track along any given set of measurement lines.

The means for sampling the control signal as required may take any one of a number of different forms. Perhaps the most direct way of effecting such sampling is to monitor the relative movement between the workpiece and the caliper and to provide sample control signals in accordance with that movement when the predetermined measurement points pass through the caliper. The relative movement may, for example, be monitored by limit switches or photo-electric means, but preferably a transducer is driven by the means for effecting relative movement, and the transducer signal is used as appropriate to initiate sampling control signals. Alternatively, should a stepping motor provide the drive, the number of pulses given will be a measure of the workpiece movements.

As thus far described the invention provides very effective and versatile apparatus for carrying out thickness measurements in a number of different environments. Reverting again to the particular case of turbine blades it would be of material advantage to be able to measure twist, bow and profile of these blades as part of the general quality control process. To provide a facility for these measurements the apparatus therefore desirably includes means for measuring movement of the support in a direction parallel to the direction of the caliper axis. Such means may conveniently be a transducer acting between the support and a fixed element to provide an output signal representative of movement of the support relative to the fixed element. It will be remembered that the first jaw is fixed relative to the support and that it is biased into contact with the first face of the workpiece by the biasing means acting on the support. Thus, as the workpiece is moved through the caliper the support is constrained to move in accordance with the spatial position of the point of contact of the first jaw with the first face. The support thus moves in correspondence with the contour of the first face of the workpiece and the signal from the additional transducer is thus representative of this contour, and can be used in the calculation of twist and bow, and in the inspection of profile.

Apparatus according to the invention is particularly well suited to control by a single board microcomputer which may compare sample measurements from a workpiece with a set of required standard measurements for that workpiece and generate an accept or reject signal as well as giving the actual workpiece measurement values if required.

In order that the invention may be better understood a particular embodiment of measuring apparatus in accordance therewith will now be described in more detail, by way of example only, with reference to the accompanying drawings in which:

FIG. 2 is a cross-section taken on the line II—II of FIG. 1;

FIG. 3 is a schematic view of part of a suitable workpiece drive system; and

FIG. 4 is a block circuit diagram.

Figure 1:
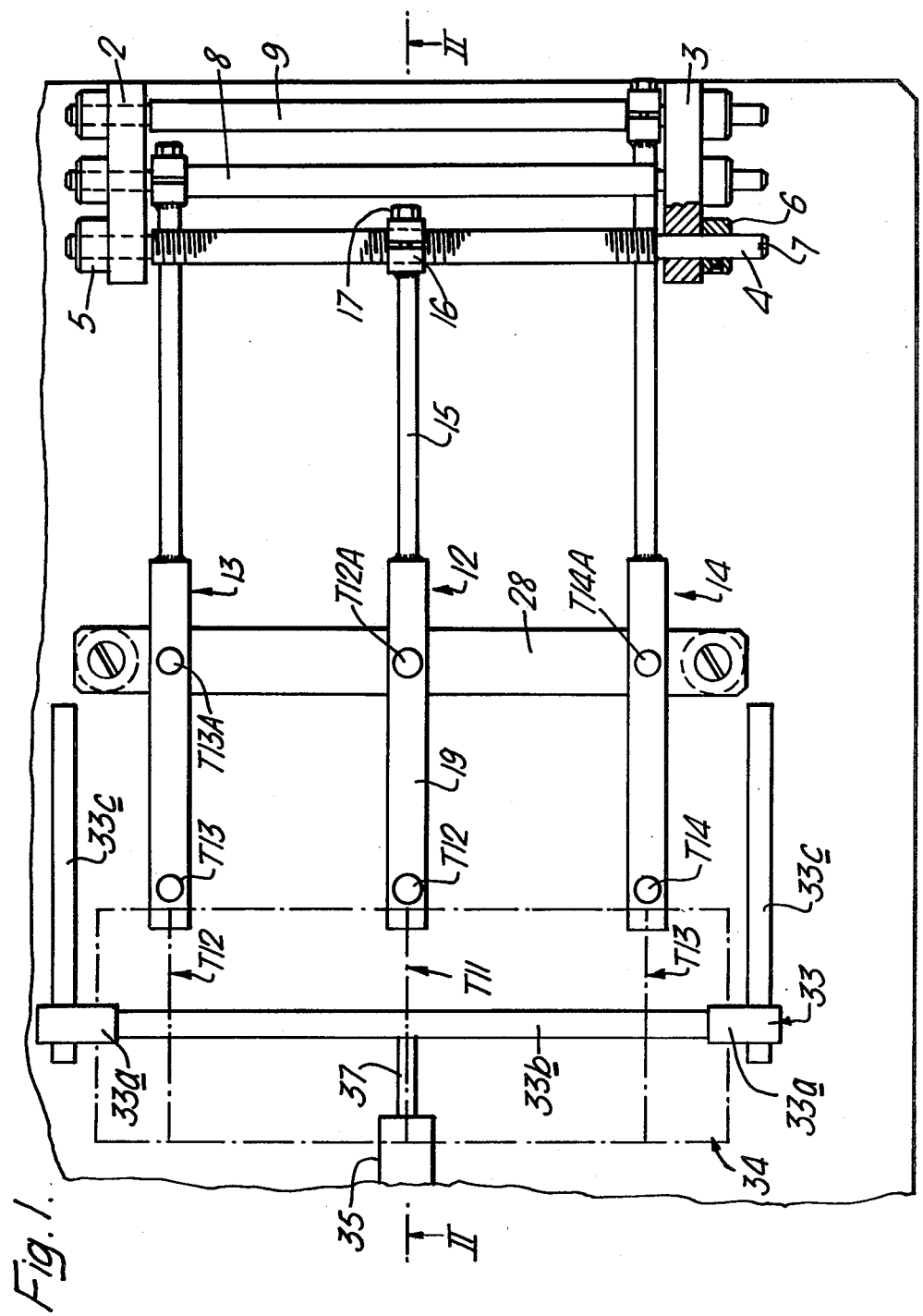
FIG. 1 is a plan view of the apparatus.

The apparatus comprises a base 1, at one end of which are mounted two opposite support plates 2 and 3. A threaded shaft 4 extends between the plates and is pivotally mounted therein, stops 5 and 6 being provided to hold the shaft axially in position. A screwdriver slot is formed in one end of the shaft. Two further identical shafts 8, 9 extend between the plates, being pivoted in holes 10, 11 in the end plates.

Three identical caliper assemblies 12 to 14 are provided, one associated with the shaft 4 and the others associated each with the shafts 8, 9. Only the assembly 12 will be described in full detail. The assembly 12 has a mount which includes an arm 15 soldered to a mounting block 16 which is screw-threaded on the shaft 4 and can be clamped into any required axial position on the shaft by means of a clamping bolt 17. Axial adjustment of the mount on the shaft can be effected by loosening the clamping bolt and rotating the shaft 4 by a screwdriver engaged in the slot 7. A pair of vertically spaced arms 18 and 19 extend from the rod 15. A first caliper jaw 20 is adjustably mounted in the lower jaw 18 by a screw-threaded connection, and when adjusted as required in the lower jaw is locked in position by a set screw 21. A second caliper jaw assembly 22 is secured in a bore in the upper arm 19 by a set screw 23. The assembly 22 includes a body 24 within which the jaw tip 25 is axially slidable, the tip 25 being biased towards the jaw 20 by a biasing spring 25a included within the body 24. The body 24 also houses a transducer T12 controlled by the jaw tip 25 to produce an output signal. The lower arm 18 has a downwardly projecting guide pin 26 which locates the upper end of a compression spring 27, the other end of which engages the base in order to bias the caliper assembly upwardly away from the base. The corresponding transducers of caliper assemblies 13, 14 are shown in T13 and T14 respectively.

Movement of each caliper assembly away from the base is limited by a bridge 28 extending between the arms of all three caliper assemblies. The lower arm of each caliper is adjustable relative to the bridge by an adjusting bolt 29 and can be secured at the required setting by a lock nut 30. The upper arm 19 of caliper assembly 12 carries an assembly 31 housing a second transducer T12A operated by a movable tip 32 biased into contact with the upper surface of the bridge 28. Similar second transducers T13A and T14A are associated with the caliper assemblies 13, 14 respectively.

Also mounted on the base 1 is a carriage 33 of any suitable form for mounting a turbine blade shown in phantom outline as 34 and means for driving the blade linearly in the direction of the arrows shown in the figures. The carriage may be made up of uprights 33a and cross members 33b, each upright having at its foot a guide that cooperates with a guideway 33c in the base 1. A simple drive system that may be used is shown in more detail in FIG. 3. This comprises a cylinder 35 in which is mounted a piston 36 and a piston rod 37 to which a cross member 33b of the carriage 33 is connected. The piston-cylinder combination is single acting and includes a compression spring 38. Pressure fluid from a reservoir 39 may flow into the cylinder 35 through a one-way valve 40. In parallel with the one-way valve 40 is a uni-directional controlled flow valve 41 allowing flow at a controlled rate from the cylinder back to the reservoir 39, and in series therewith a stop valve 42. In use, the operator loads the turbine blade to the mounts and then moves the blade through the calipers, simultaneously compressing the spring 38 and charging the fluid through the valve 40 into the cylinder 35. The stop valve 42 is closed during this operation. When in position a limit switch is engaged. The measuring process is initiated by opening the valve 42; the spring drives fluid from the cylinder through the controlled flow valve 41, which acts to limit the rate of flow and thus to limit the velocity at which the piston rod and thus the turbine blade is moved. That movement operates the limit switch to signal the start of a measurement cycle and returns the blade through the jaws of the three calipers, which contact the blade surfaces along the required measurement lines indicated by chain lines M1 to M3 in FIG. 1.

During that movement signals will be received from the three transducers T12 to T14 representative of the blade thickness in the area of the blade that is at that time present between the caliper jaws. Signals will be received from the transducers T12A to T14A that are representative of the distance above the base of the point on the lower surface of the blade that is in contact with the lower caliper jaw 20. Additionally, a transducer TD is linked to the drive means to provide an output corresponding to the distance moved by the blade from the starting position. As shown in FIG. 4 each of these signals is amplified and passed through a multiplexing switch 42 which, according to the channel selected, passes the appropriate signal to an analogue to digital converter 43 which in turn feeds the digital data into a single board micro-computer 44. The micro-computer is programmed to effect control of the measuring operation. This will in general terms be such that as driving of the turbine blade is commenced the signal from the position transducer TD will be fed by the multiplexing switch to the analogue to digital converter. When the digital data received by the microcomputer corresponds to stored digital data indicating that the first required measuring point has been reached a channel select signal will be passed to the multiplexing switch cutting off the signal from the position transducer TD and sampling in rapid sequence the signals from the three thickness transducers T12 to T14 and the three profile transducers T12A to T14A. After sampling, the channel select signal to the multiplexing signal is changed to again pass the signal from position transducer TD to the analogue to digital converter. The sampling procedure is repeated at the other required measuring points and at the end of the cycle the blade has been returned to the position shown in phantom outline and can be removed from the mounts.

The signals provided may be used by the computer as required. Each individual thickness signal will generally be compared with stored data to ensure that it falls within a given tolerance range. If all signals fall within their required tolerance ranges then an accept signal may be generated by the computer. If not, then a reject signal may be generated, which signal may differentiate between an undersized thickness which cannot be cured, and an oversized thickness which can be cured by further grinding work. Additionally, the computer may analyse the profile signals against stored ideal profile signals and generate accept or reject signals on this basis also. The comparison may be made against data stored in memory for commonly encountered types of blade or, for example, with tapes-stored data for more rarely encountered types. In addition to accept or reject signals measurement values may be displayed as required.

It will be understood that many variations of this apparatus are possible. There has been described a system for effecting measurements along three parallel lines, particularly useful in the inspection of turbine blades according to current parameters. However, with other workpieces different requirements may be imposed. Particularly in applications where frequent changes of workpiece are foreseen, each with a different set of measurement requirements it is possible to use a single thickness measuring caliper and associated transducer, with the path of the workpiece through the caliper to cover the measuring points being controlled by the computer following an input of the workpiece type. This method requires driving of the workpiece along two orthogonal axes. This variation of the apparatus may include a profile transducer equivalent to the transducer T12A, or may be restricted solely to measurement thickness by a transducer such as T12. Indeed the apparatus described may omit the profile transducers such as T12A in certain embodiments.

Selection of the microcomputer and the associated electronic equipment may be made from a very wide choice, which may be dictated in some measure by the accuracy that is required.

The drive means for the workpiece may vary from the spring loaded pneumatically damped arrangement described and may be any other fluid-driven or electrically driven arrangement, particularly a stepping motor drive.

I claim:

1. Apparatus for measuring the thickness of a workpiece at a plurality of predetermined points separated one from another along a predetermined measurement line comprising a caliper having first and second opposed jaws mounted on a support, means for biasing the support to maintain the first jaw in contact with a first surface of the workpiece, means for biasing the second jaw relative to the support to maintain the second jaw in contact with a second surface of the workpiece, a transducer controlled by the second jaw to produce a signal representative of workpiece thickness, means for mounting the workpiece, means for effecting relative movement between the workpiece and the caliper so that the predetermined measurement line passes between the jaws of the caliper, means for sampling the output signal from the transducer as the predetermined points pass between the jaws of the caliper, and means for processing the sample signals to provide thickness measurements at the predetermined points.

2. Apparatus according to claim 1 for measurement at points along a predetermined rectilinear measurement line, in which the means for effecting relative movement are such as to effect relative rectilinear movement.

3. Apparatus according to claim 1 in which the means for effecting relative movement are means for effecting movement of the workpiece.

4. Apparatus according to claim 1, for measurement at a plurality of predetermined points along each of a plurality of spaced apart parallel measurement lines, the apparatus including a plurality of calipers equal to the plurality of measurement lines and spaced apart correspondingly to the spacings between the measurement lines, each caliper having first and second jaws mounted on a support, means for biasing the support to maintain the first jaw in contact with a first surface of the workpiece, means for biasing the second jaw relative to the support to maintain the second jaw in contact with a second surface of the workpiece and a transducer controlled by the second jaw to produce a signal representative of workpiece thickness, and means being provided for sampling the output signal from the transducer associated with each of the calipers.

5. Apparatus according to claim 4 in which the support for each caliper is an arm extending from a mounting arrangement and pivotally mounted thereon about an axis transverse to the arm and to the axis of the caliper and means are provided for adjusting at least one of the arms on the mounting arrangement in order to adjust the spacing between adjacent calipers.

6. Apparatus according to claim 1 and including means for measuring movement of the support in a direction parallel to the direction of the caliper axis.

7. Apparatus according to claim 6 in which the measuring means is a transducer acting between the support and a fixed element to provide an output signal representative of movement of the support relative to the fixed element.

* * * * *